United States Patent [19]
Warlimont et al.

[11] Patent Number: 5,672,181
[45] Date of Patent: Sep. 30, 1997

[54] METHOD FOR MANUFACTURING A HARDENED LEAD STORAGE BATTERY ELECTRODE

[75] Inventors: Hans Warlimont, Am Weinberg 2, D-63579 Freigericht, Germany; Marco Olper, Malland, Italy; Armin Ueberschaer; Klaus Drefahl, both of Frankfurt, Germany

[73] Assignee: Hans Warlimont, Freigericht, Germany

[21] Appl. No.: 535,100

[22] PCT Filed: Jan. 27, 1995

[86] PCT No.: PCT/DE95/00112
  § 371 Date: Apr. 22, 1996
  § 102(e) Date: Apr. 22, 1996

[87] PCT Pub. No.: WO95/22642
  PCT Pub. Date: Aug. 24, 1995

[30] Foreign Application Priority Data

Feb. 16, 1994 [DE] Germany .......................... 44 04 817.3

[51] Int. Cl.⁶ .................................................. H01M 6/00
[52] U.S. Cl. ........................ 29/623.5; 429/199; 429/225; 429/226; 429/227; 429/228; 205/122; 205/299
[58] Field of Search ................................. 429/225, 226, 429/227, 228, 199; 29/623.5; 205/122, 299

[56] References Cited

U.S. PATENT DOCUMENTS

| | | | |
|---|---|---|---|
| 3,253,912 | 5/1966 | Rooney | 75/166 |
| 3,552,000 | 1/1971 | Hirschfeld | 29/527.2 |
| 3,844,910 | 10/1974 | Lipp et al. | 204/45 R |
| 4,043,878 | 8/1977 | Ehrsam | 204/16 |
| 4,098,654 | 7/1978 | Helle et al. | 204/16 |
| 4,235,681 | 11/1980 | Shreir | 204/16 |

FOREIGN PATENT DOCUMENTS

| | | |
|---|---|---|
| 0 038 366 | 4/1980 | European Pat. Off. |
| 48-80437 | 1/1972 | Japan . |
| 1 362 558 | 8/1974 | United Kingdom . |

OTHER PUBLICATIONS

"Bleiakkumulatoren," Varta Batterie AG, pp. 34–35 no month or year available.
"Lead and Lead Alloys, Properties and Technology" Hofmann, pp. 44–51, 74–101 (1970) no month available.
"Strengthening of Electrodeposited Lead and Lead Alloys, I. Process Development," Wiesner et al., Plating, Apr., 1970, pp. 358–361.
"Dispersion Strengthened Lead: Developments and Applications in the Chemical Industry," Lloyd et al., Proc. Conf. on Lead, 1968, pp. 255–267 no month available.
"Dispersion Strengthening of Lead by Coprecipitation," Tilman et al., Report of Investigations 7570, U.S. Dept. of the Interior, Bureau of Mines no year or month available.
"Deposition of Dispersion–Hardened Lead Coatings," Pini et al., Chemical Abstracts, vol. 89, No. 2, Jul., 1978, p. 496.
"Electrodeposition of Dispersion–Hardened Lead Coatings", Pini et al., Chemical Abstracts, vol. 87, No. 1, Sep. 5, 1977, p. 503.

*Primary Examiner*—Bruce F. Bell
*Attorney, Agent, or Firm*—Hill, Steadman & Simpson

[57] ABSTRACT

A method for manufacturing a hardened lead storage battery electrode wherein fine, particulate solids, that are insoluble in lead, are incorporated into a lead matrix. The method includes the steps of incorporating solids, dissolved or suspended in an electrolyte, into a lead matrix such that shaping simultaneously occurs during the deposition of lead due to a suitable fashioning of a plurality of electrically conductive surface regions; vigorously agitating the electrolyte by introducing air through an apertured plate in the bottom of an electrolyte vessel providing an electrochemical cell including a cathode and a Cu/Ta/Pt anode and an electrolyte solution including $HBF_4$ and an electrolyte selected from PbO, $Pb(OH)_2$ and $PbCO_3$ or including a graphite anode and an electrolyte solution of $Fe(BF_4)_2$ and $Fe(BF_4)_3$. The electrolyte is prepared from a raw material selected from lead, waste material containing lead and desulfured lead storage battery electrolyte paste. The deposition is carried out at a current density of about 100 to about 2000 $A/m^2$.

31 Claims, No Drawings

METHOD FOR MANUFACTURING A HARDENED LEAD STORAGE BATTERY ELECTRODE

This application is a 371 of PCT/DE 95/00112 filed Jan. 27, 1995.

BACKGROUND OF THE INVENTION

The invention is directed to a method for manufacturing a hardened lead storage battery electrode, finely particulate solids that are insoluble in lead being dispersively distributed in the lead matrix thereof.

Plate grids for lead accumulators are mainly manufactured by gravity casting into moulds by hand or with casting machines and by diecasting with warm chamber or cold chamber diecasting machines. Continuous gravity casting with a drum casting machine and subsequent grid fabrication according to the expanded metal technique is also significant. Punching and stamping of plate grids and build-up welding of pre-fabricated grid parts, for example extruded rods on the basis of gravity casting or diecasting, are less wide-spread. The manufacturing methods respectively comprise specific disadvantages. In gravity casting, the minimum plate thickness is limited to 1 mm and the plate thickness is not constant due, among other things, to irregular erosion of the coating in the casting mold. The diecasting method requires a specific viscosity of the molten metal. For example, lead-antimony alloys having an antimony content of 3 through 8% are therefore not capable of being processed. In continuous gravity casting in a drum casting machine, the minimum plate thickness is limited to approximately 1 mm. The utilization of the raw material is comparatively low in grid manufacture by punching and stamping and the possibilities of grid design are limited. The manufacture of a grid according to the expanded metal technique does not allow a complete optimization of the grid geometry.

Lead alloys are employed as materials for the lead storage battery electrodes since the apparent yield stress (static strength) and the creep resistance (long-time rupture strength) of pure lead are too low.

In order to increase the strength of lead, it is alloyed with elements such as, for example, antimony or calcium and tin, whereby solid solution hardening and dispersion hardening take effect (W. Hofmann, *Blei und Bleilegierungen*, Springer-Verlag, Berlin/Göttingen/Heidelberg 1962). These alloy elements, however, fundamentally raise the electrical resistance and often have a disadvantageous influence on the electrochemical properties such as the corrosion behavior and the battery behavior due to the formation of gas.

In the light of this background, methods were developed in order to increase the strength of lead storage battery electrodes by dispersion hardening, whereby particles that are insoluble in lead and have a predetermined size and optimally small average spacing must be dispersively integrated into the lead material. Various methods of powder metallurgy have been proposed for producing a lead oxide dispersion in lead in U.S. Pat. No. 3,253,912 and by A. Lloyd, E. R. Newson, "Dispersion strengthened lead: developments and applications in the chemical industry", Proc. .Conf.on Lead, 1968, 255–267. A powder metallurgical method for producing an aluminum oxide dispersion in lead was disclosed by M. M. Tilman, R. L. Crosby, D. H. Desy, *Dispersion strengthening of lead by coprecipitation*, Report BM RI 7570, U.S. Department of the Interior, Washington 1971. These methods, however, all have the disadvantage of non-optimum particle size and dispersion and of comparatively high cost, and also lead to technical problems such as unfavorable electrochemical behavior and lack of weldability. Economical and technical difficulties are thus established in these methods for technical application, for example in batteries.

Fundamentally, thin metal layers with dispersively distributed phases embedded therein can be manufactured by precipitation onto solid bodies from all metals with which an electrodeposition is possible such as, for example, copper, nickel, iron, zinc and lead.

According to the current state of the art, particles of graphite, PTFE, $Al_2O_3$, SiC and other substances are introduced into galvanic layers (dispersion coatings) in that they are deposited on the substrate simultaneously with the metal, being deposited from a suspension in the electrolyte under controlled conditions. This state of the art led to numerous works about methods for improving the properties of electrodeposited dispersion coatings. The dispersion coatings are employed as functional surface coatings, particularly as anti-wear coatings with nickel as metal matrix. A high proportion of the dispersively integrated phase (dispersoid) given optimally uniform distribution of the dispersoid in the metal matrix is desired in many instances. Thus, DE-AS 22 36 443 discloses an amino organosilicon compound, DE-AS 26 43 758 discloses a cationic as well as a non-ionic fluorocarbon compound, DE-AS 26 46 881 discloses imidasoline hydroxides, and DE-AS 26 46 881 discloses dimethylaminoxides as additives for increasing the deposition rate of the dispersively integrated constituent.

Wiener et al. (Plating 4, 1970, pages358 through 361) disclosed the hardening of electrolytically deposited lead and lead alloys by employing specific additives and embedding dispersoids. Of the additives investigated, the combination of lignin sulfonic acid and cumarin proved most effective. They achieved the desired increase in hardness only by adding $TiO_2$ with an average grain size of 0.03 through 0.01 μm. The current density amounted to 270 through 540 $A/m^2$.

Japanese published application JP-O-47 11264 discloses a method for the electrolytic manufacture of coatings and galvanoplastics from lead materials upon employment of an electrolyte that contains Pb-fluoroboride, Pb-fluorosilicate or Pb-sulfamate, 0.0005 through 5 g/l copper and, optionally, 0.025 through5 g/l of a high-molecular polyacrylamide. The solution is agitated with a magnetic agitator. The lead deposition is implemented with lead plates as anode, steel plates as cathode and with a current density of 500 through 1000 $A/m^2$.

According to current opinion, lead materials that contain metals with low hydrogen overvoltage promote self-discharge due to hydrogen development at the negative electrode. Lead itself has an extremely high hydrogen overvoltage. When the lead electrode is therefore combined in an electrolyte solution with another metal having a low hydrogen overvoltage, then a correspondingly more pronounced development of hydrogen occurs at this electrode and the lead electrode is discharged correspondingly faster. This is also true of metals that are electrodeposited on the electrode (formation of local elements). Particularly the metals having extremely low hydrogen overvoltage (precious metals, silver, nickel, copper) can increase the development of hydrogen to such an extent that a pronounced formation of bubbles begins, the term "continued gassing metals" deriving therefrom (manual "Bleiakkumulatoren", Varta Batterie AG (editor), VDI-Verlag, Düsseldorf 1986). The employment of a copper-containing lead storage battery material for the positive electrode therefore does not seem meaningful.

SUMMARY OF THE INVENTION

A goal of the invention is a method for manufacturing a hardened lead storage battery electrode having properties improved compared to pure lead and lead alloys hitherto employed that can be economically manufactured in technically usable, short times.

This is inventively achieved in that the solids dissolved or suspended in the electrolyte during an electrolytic lead deposition are incorporated into the lead matrix; in that the shaping ensues at the same time during the deposition due to a suitable fashioning of the electrically conductive surface regions; in that the electrolyte is highly agitated by introducing air through an apertured plate in the bottom of the electrolyte vessel; in that the current density amounts to 100 through 2000 A/m$^2$, preferably 600 through 2000 A/m$^2$; in that the electrochemical cell is composed of a cathode as well as of a Cu/Ta/Pt anode; and in that HBF$_4$ solution as well as lead, waste material containing lead and/or desulfured lead storage battery electrolyte paste are employed as raw materials for the production of an electrolyte that contains PbO, Pb(OH)$_2$ or PbCO$_3$.

What is to be understood by "suitable fashioning of the electrically conductive surface regions of the cathode" is that the electrically conductive surface regions of the cathode form a specific pattern that corresponds to the desired shape of the deposited battery electrode.

Compared to traditional electrodes for lead storage batteries, the dispersion hardened lead storage battery electrodes manufactured according to the inventive method have improved mechanical properties and a reduced electrical resistance. The static strength and the creep strength are increased, this enabling a reduction of the supporting crosssection of the electrodes. This reduction in crossection allows an increase in the weight-related energy storage density without negatively influencing the electrochemical properties of the battery electrode. By contrast to traditional battery electrodes, no limits are thereby placed on a reduction in crossection due to the manufacturing method. The inventive method thus guarantees a rapid and uniform deposition of the lead material. The cost-beneficial manufacture of a lead storage battery electrode is thus possible. A complicated and expensive finishing operation is not required, namely, due to the net shape and technically usable structure and Surface quality of the deposited battery electrode. Moreover, thickness and shaping of the battery electrode can be varied within broad limits, the possibility of maximum paste utilization due to the optimization of the thickness and the contact area with the electrode deriving as a result. Further, the inventive method yields the possibility of varying the proportion of solids built into the lead matrix for a given composition of the electrolyte by setting a specific current density. It has been shown, namely, that, for example, the relative copper part built into the lead matrix with reference to the copper content of the electrolyte solution increases with lower current density.

The object underlying the invention is also achieved by a method wherein the solids dissolved or suspended in the electrolyte are integrated into the lead matrix during an electrolytic lead deposition, wherein the shaping ensues at the same time during the deposition due to a suitable fashioning of the electrically conductive surface regions of the cathode, wherein the electrolyte is highly agitated by introducing air through an apertured plate in the floor of the electrolyte vessel, wherein the current density amounts to 100 through 2000 A/m$^2$, preferably 600 through 2000 A/m$^2$, wherein the electrochemical cell is composed of a cathode, a diaphragm as well as a graphite anode, and wherein a Fe(BF$_4$)$_2$/Fe(BF$_4$)$_3$ solution as well as lead, waste material containing lead and/or lead scrap are employed as raw materials for the production of the electrolyte.

With this modification of the inventive method, specific waste materials such as, for example, used lead storage battery electrodes or electrode paste can be employed as raw materials for the production of the electrolyte, this denoting a further cost-saving for the manufacture of deposited lead storage battery electrodes.

It is provided in a further development of the invention that 50 through 300 g/l Pb$^{++}$, 50 through 200 g/l free HBF$_4$ and 1 through 5 g/l H$_3$PO$_4$ are contained in the electrolyte. The formation of PbO$_2$ is advantageously prevented with the addition of H$_3$PO$_4$.

It is provided in a further development of the invention that 50 through 200g/l Pb$^{++}$, 10 through 50 g/l Fe$^{++}$, 0.1 through 5 g/l Fe$^{+++}$ and 10 through 100 g/l free HBF$_4$ are contained in the electrolyte.

It is provided in a further development of the invention that the current density amounts to 1100 through 2000 A/m$^2$. These extremely high current densities assure very high deposition rates and, thus, very short manufacturing times of the battery electrode.

It is provided in a further development of the invention that, due to a suitable shaping of the cathode or an insulating covering of the cathode in a specific pattern, the deposited material at the electrically conductive surface regions of the cathode yields the shape of a grid.

It is provided in a further development of the invention that gelatines, glue, β-naphthol, rescorcin, calcium lignin sulfonate and/or peptone is added to the electrolyte as additive in a concentration of 0.1 through 2 g/l each. The addition of these additives assures an especially uniform deposition of the lead and of the solid.

It is provided in a further development of the invention that a polyacrylic acid amide as added to the electrolyte as additional additive in a concentration of 0.05 through 5 g/l . The addition of this additive promotes the uniform deposition of the lead and of the solid.

It is provided in a further development of the invention that the compound Y$_2$O$_3$, Al$_2$O$_3$, ZrO$_2$, SiO$_2$, TiO$_2$, SiC, WC, TiC, BaSO$_4$, BN and/or Si$_3$N$_4$ in a concentration in the electrolyte of 5 through 150 g/l each and/or the metal Sn, As, Sb, Bi, Cu, Se, Te and/or Ag in a concentration in the electrolyte of 0.01 through 5 g/l each is employed as solid.

It is provided in a further development of the invention that the metal Sn, As, Sb, Bi, Cu, Se, Te and/or Ag is employed in a concentration in the electrolyte of 0.01 through 5 g/l each.

It is provided in a further development of the invention that the compound Y$_2$O$_3$, Al$_2$O$_3$, ZrO$_2$, SiO$_2$, TiO$_2$, SiC, WC, TiC, BaSO$_4$, BN and/or Si$_3$N$_4$ is present in a grain size of 0.005 through 5 μm.

It is provided in a further development of the invention that the electrolytic lead deposition is implemented at temperatures between 30° and 90° C.

It is provided in a further development of the invention that the cathode is composed of a plate of an electrical insulator material with electrically conductive tracks applied thereon, the lead material depositing on said tracks and their arrangement thus defining the shaping.

It is provided in a further development of the invention that a copper track is employed as electrically conductive track, this being manufactured by leeching a copper layer that is applied on the electrical insulator material and is covered with a mask, whereby the manufacture of the mask ensues in a phototechnical way.

It is provided in a further development of the invention that the electrolytically deposited, hardened lead electrode is after-coated with pure lead. The corrosion resistance of the lead electrode is improved by the after-coating with pure lead, for example high-purity lead.

The subject matter of the invention shall be set forth in greater deal below with reference to examples.

DESCRIPTION OF THE PREFERRED EMBODIMENTS

A lead storage battery electrode, pursuant to the present invention, may be manufactured according to the following examples.

EXAMPLE 1

PbO that is dissolved in $HBF_4$ in a drum mixer is utilized as raw material for manufacturing the electrolytic solution. $Pb(BF_4)_2$ arises:

$2\ HBF_4 + PbO \rightarrow Pb(BF_4)_2 + H_2O$.

The lead is deposited at a cathode in an electrolysis cell from the aqueous $Pb(BF_4)_2$ solution, which contains 150 g/l $Pb^{++}$, 100 g/l free $HBF_4$, 2.5 g/l $H_3PO_4$, 0.6 g/l glue as well as 0.4 g/l calcium lignin sulfonate, this cathode being composed of an epoxy resin carrier and copper tracks applied thereon in the form of a grid. Oxygen is released at an anode that is composed of a copper/tantalum/platinum wire:

$Pb(BF_4)_2 + H_2O \rightarrow Pb + 2\ HBF_4 + \tfrac{1}{2} O_2$.

The solid suspended in the electrolyte, SiC powder having an average grain size of 1 μm and in a concentration of 50 g/l or copper in a concentration of 0.4 g/l, is held in suspension and circulated about 10 times per hour by introducing air through an apertured plate in the floor of the electrolyte vessel. The electrolytic lead deposition is implemented at a temperature from 35 through 45° C. and given a current density of 800 and 1200 A/m². Dispersion hardened lead storage battery electrodes having a thickness of 0.3 through 0.6 mm are manufactured with this method. The dispersoid contents in the lead matrix amount to up to 4 mass percent SiC or up to 0.8 mass percent copper. The incorporation of the dispersoids into the lead storage battery electrode results in a clear increase in strength compared to an electrode of pure lead. Whereas the electrode of pure lead has a hardness value #3 (19/62,5/30) of 4, the dispersion hardened lead storage battery electrodes achieve hardness values of 8 through 10 (SiC dispersoids) and 20 through 24 (copper dispersoids).

EXAMPLE 2

Lead scrap in the form of used lead storage battery electrodes that are dissolved in $Fe(BF_4)_3$ are utilized as raw material for manufacturing the electrolyte solution. $Pb(BF_4)_2$ arises:

$2\ Fe(BF_4)_3 + Pb \rightarrow Pb(BF_4)_2 + 2\ Fe(BF_4)_2$.

The lead is deposited at a cathode in the electrolysis cell from the aqueous $Pb(BF_4)_2$ solution that contains 30 g/l $Fe^{++}$, 1 g/l $Fe^{+++}$, 30 g/l free $HBF_4$ as well as 1 g/l glue:

$Pb(BF_4)_2 \rightarrow Pb + 2\ BF_4^-$.

The cathode is composed of an epoxy resin carrier and copper tracks applied thereon in the form of a grid. Iron is oxidized at a graphite anode that is separated from the cathode by a diaphragm:

$Fe(BF_4)_2 + BF_4^- \rightarrow Fe(BF_4)_3$.

The solid suspended in the electrolyte, SiC powder having an average particle size of 1 μm and in a concentration of 50 g/l therefor copper in a concentration of 0.4 g/l, is kept in suspension and circulated about 10 times an hour by introducing air through an apertured plate in the bottom of the electrolyte vessel. The electrolytic lead deposition is implemented at a temperature of 35 through 45° C. and given a current density of 800 and 1200 A/m². Dispersion hardened lead storage battery electrodes having a thickness of 0.3 through 0.6 mm are manufactured. The dispersoid contents in the lead matrix amount to up to 4 mass percent SiC or 0.8 mass percent copper. The incorporation of the dispersoids into the lead storage battery electrode results in a clear increase in strength compared to an electrode of pure lead. The hardness value of the electrode of pure lead HB(19/62, 5/30) amounts to 4. By comparison thereto, the dispersion hardened lead storage battery electrodes comprise hardness values HV of 8 through 10 (SiC dispersoids) and 20 through 24 (copper dispersoids). Electrochemical measurements show that the hydrogen over-voltage at the electrodes dispersion hardened with Cu is not significantly lowered within the framework of the obtainable accuracy of measurement, namely both compared to lead as well as to commercially obtainable lead storage battery electrode materials.

The invention is not limited to the particular details of the methods described and other modifications and applications are contemplated. Certain other changes may be made in the above-described agent without departing from the true spirit and scope of the invention herein involved. It is intended, therefore, that the subject matter in the above description shall be interpreted as illustrative and not in a limiting sense.

We claim:

1. A method for manufacturing a hardened lead storage battery electrode comprising the steps of:

preparing an electrolyte by using raw material selected from the group consisting of lead, waste material containing lead, and desulfured lead storage battery electrolyte paste to form an $HBF_4$ solution containing lead and lead compounds selected from the group consisting of PbO, $Pb(OH)_2$ and $PbCO_3$;

mixing solids into said electrolyte;

electrolytically depositing lead onto a plurality of electrically conductive surface regions of a cathode in a vessel containing said electrolyte mixed with said solids and forming an electrochemical cell consisting of said cathode, said electrolyte solution and a Cu/Ta/Pt anode by producing a current through said electrolyte solution between said cathode and said anode having a current density of from approximately 100 to about 2000 A/m²;

maintaining said solids mixed in said electrolyte while electrolytically depositing lead and vigorously agitating said electrolyte solution by introducing air into said vessel through an apertured plate in a bottom of said vessel; and selecting a shape of said electrically conductive surface regions for producing a selected coupled shape of said lead storage battery electrode on said electrically conductive surface regions simultaneously with the electrolytic lead deposition.

2. The method as defined in claim 1, wherein said electrolyte comprises from about 50 to about 300 g $Pb^{++}$/l, from about 50 to about 200 g free $HBF_4$/l and from about 1 to about 5 g $H_3PO_4$/l.

3. The method as defined in claim 1 wherein the current density is from about 1100 to about 2000 A/m$^2$.

4. The method as defined in claim 1 wherein due to a shaping of the cathode or an insulating covering of the cathode in a specific pattern, the deposited material at the plurality of electrically conductive surface regions of the cathode forms a grid-shaped pattern.

5. The method as defined in claim 1 further comprising the step of adding an additive selected from the group consisting of: gelatines, glue, β-naphthol, resorcin, calcium lignin sulfonate and peptone to the electrolyte in a concentration of from about 0.1 to about 2 g/l.

6. The method as defined in claim 1 further comprising the step of adding a polyacrylic acid amide to the electrolyte as an additional additive in a concentration from about 0.05 to about 5 g/l.

7. The method as defined in claim 1 further comprising the step of employing a compound selected from the group consisting of: $Y_2O_3$, $Al_2O_3$, $ZrO_2$, $SiO_2$, $TiO_2$, SiC, WC, TiC, $BaSO_4$, BN and $Si_3N_4$ in a concentration in the electrolyte from about 5 to about 150 g/l each and a metal selected from the group consisting of Sn, As, Sb, Bi, Cu, Se, Te and Ag in a concentration in the electrolyte from about 0.01 to about 5 g/l.

8. The method as defined in claim 7, wherein the compound selected from the group consisting of $Y_2O_3$, $Al_2O_3$, $ZrO_2$, $SiO_2$, $TiO_2$, SiC, WC, TiC, $BaSO_4$, BN and $Si_3N_4$ is present in a grain size of from about 0.005 to about 5 μm.

9. The method as defined in claim 1 further comprising the step of employing a metal selected from the group consisting of Sn, As, Sb, Bi, Cu, Se, Te and Ag in a concentration in the electrolyte of from about 0.01 to about 5 g/l.

10. The method as defined in claim 1 wherein the electrolytic lead deposition is implemented at temperatures of from about 30° to about 90° C.

11. The method as defined in claim 1 further comprising the steps of:
using a cathode composed of a plate of an electrical insulator material with at least one electrically conductive track applied thereon;
wherein the step of electrolytically depositing lead comprises electrolytically depositing lead on said at least one electrically conductive track; and
arranging said at least one electrically conductive track such that shaping occurs.

12. The method as defined in claim 11, further comprising the steps of:
employing a copper track as said at least one electrically conductive track;
manufacturing said copper track by depositing a copper layer on the electrical insulator material;
covering the copper layer with a phototechnically manufactured mask and thereby leaving unmasked portions of said copper layer;
leaching said unmasked portions of said copper layer phototechnically.

13. The method as defined in claim 1 further comprising the step of after-coating the electrolytically deposited, hardened lead storage battery electrode with a pure lead.

14. A method as defined in claim 1 wherein the step of mixing solids into said electrolyte comprises dissolving said solids into said electrolyte.

15. A method as defined in claim 1 wherein the step of mixing solids into said electrolyte comprises suspending finely particulate solids insoluble in lead into said electrolyte.

16. The method as defined in claim 1 wherein said current vessel has a density of from about 600 to about 2000 A/m$^2$.

17. A method for manufacturing a hardened lead storage battery electrode comprising the step of:
preparing an electrolyte by using raw material selected from the group consisting of lead, waste material containing lead, and desulfured lead storage battery electrolyte paste to form a solution of $Fe(BF_4)_2$ and $Fe(BF_4)_3$ and containing lead;
mixing solids into said electrolyte;
electrolytically depositing lead onto a plurality of electrically conductive surface regions of a cathode in a vessel containing said electrolyte mixed with said solids and forming an electrochemical cell consisting of said cathode, said electrolyte solution and a graphite anode by producing a current through said electrolyte solution between said cathode and said anode having a current density of from approximately 100 to about 2000 A/m$^2$;
maintaining said solids mixed in said electrolyte while electrolytically depositing lead and vigorously agitating said electrolyte solution by introducing air into said vessel through an apertured plate in a bottom of said vessel; and
selecting a shape of said electrically conductive surface regions for producing a selected coupled shape of said lead storage battery electrode on said electrically conductive surface regions simultaneously with the electrolytic lead deposition.

18. The method as defined in claim 17, wherein said electrolyte comprises from about 50 to about 200 g $Pb^{++}$/l, from about 10 to about 50 g $Fe^{++}$/l, from about 0.1 to about 5 g $Fe^{+++}$/l and from about 10 to about 100 g free $HBF_4$/l.

19. The method as defined in claim 17, wherein said electrolyte comprises from about 50 to about 300 g $Pb^{++}$/l, from about 50 to about 200 g free $HBF_4$/l and from about 1 to about 5 g $H_3PO_4$/l.

20. The method as defined in claim 17 wherein the current density is from about 1100 to about 2000 A/m$^2$.

21. The method as defined in claim 17 wherein due to a shaping of the cathode or an insulating covering of the cathode in a specific pattern, the deposited material at the plurality of electrically conductive surface regions of the cathode forms a grid-shaped pattern.

22. The method as defined in claim 17 further comprising the step of adding an additive selected from the group consisting of: gelatines, glue, β-naphthol, resorcin, calcium lignin sulfonate and peptone to the electrolyte in a concentration of from about 0.1 to about 2 g/l.

23. The method as defined in claim 17 further comprising the step of adding a polyacrylic acid amide to the electrolyte as an additional additive in a concentration from about 0.05 to about 5 g/l.

24. The method as defined in claim 17 further comprising the step of employing a compound selected from the group consisting of: $Y_2O_3$, $Al_2O_3$, $ZrO_2$, $SiO_2$, $TiO_2$, SiC, SC, TiC, $BaSO_4$, BN and $Si_3N_4$ in a concentration in the electrolyte from about 5 to about 150 g/l each and a metal selected from the group consisting of Sn, As, Sb, Bi, Cu, Se, Te and Ag in a concentration in the electrolyte from about 0.01 to about 5 g/l, the compound and the metal being used as a solid.

25. The method as defined in claim 24, wherein the compound selected from the group consisting of $Y_2O_3$, $Al_2O_3$, $ZrO_2$, $SiO_2$, $TiO_2$, SiC WC, TiC, $BaSO_4$, BN and $Si_3N_4$ is present in a grain size of from about 0.005 to about 5 μm.

26. The method as defined in claim 17 further comprising the step of employing a metal selected from the group consisting of Sn, As, Sb, Bi, Cu, Se, Te and Ag in a concentration in the electrolyte of from about 0.01 to about 5 g/l.

27. The method as defined in claim 17 wherein the electrolytic lead deposition is implemented at temperatures of from about 30° to about 90° C.

28. The method as defined in claim 17 further comprising the steps of:

using cathode composed of a plate of an electrical insulator material with at least one electrically conductive track applied thereon;

depositing the raw material on said at least one electrically conductive track; and arranging said at least one electrically conductive track such that shaping occurs.

29. The method as defined in claim 28, further comprising the steps of:

employing a copper track as said at least one electrically conductive track;

manufacturing said copper track by leeching a copper layer that is applied on the electrical insulator material; and covering the copper layer with a mask, the mask being manufactured phototechnically.

30. The method as defined in claim 17 further comprising the step of after-coating the electrolytically deposited, hardened lead storage battery electrode a pure lead.

31. The method as defined in claim 17 wherein said current vessel has a density of from about 600 to about 2000 A/m$^2$.

* * * * *